United States Patent [19]
Hakki

[11] 3,824,493
[45] July 16, 1974

[54] FUNDAMENTAL MODE, HIGH POWER OPERATION IN DOUBLE HETEROSTRUCTURE JUNCTION LASERS UTILIZING A REMOTE MONOLITHIC MIRROR

[75] Inventor: Basil Wahid Hakki, Summit, N.J.

[73] Assignee: Bell Telephone Laboratories, Incorporated, Murray Hill, Berkeley Heights, N.J.

[22] Filed: Sept. 5, 1972

[21] Appl. No.: 286,283

[52] U.S. Cl. .................. 331/94.5 H, 317/235 R
[51] Int. Cl. .................................... H01s 3/00
[58] Field of Search ............... 331/94.5; 317/235

[56] References Cited
UNITED STATES PATENTS
| | | | |
|---|---|---|---|
| 3,248,670 | 4/1966 | Dill et al. | 331/94.5 |
| 3,353,115 | 11/1967 | Maiman | 331/94.5 |
| 3,758,875 | 9/1973 | Hayashi | 331/94.5 |

*Primary Examiner*—Edward S. Bauer
*Attorney, Agent, or Firm*—M. J. Urbano

[57] ABSTRACT

The waveguide region of a double heterostructure junction laser is terminated at a point distant from a remote monolithic mirror. A passive region, which extends axially between the end of the waveguide region and the remote mirror, comprises a material having low absorption loss and is substantially impedance matched to the waveguide region.

1 Claim, 6 Drawing Figures

FUNDAMENTAL MODE, HIGH POWER OPERATION IN DOUBLE HETEROSTRUCTURE JUNCTION LASERS UTILIZING A REMOTE MONOLITHIC MIRROR

BACKGROUND OF THE INVENTION

This invention relates to semiconductor junction lasers and, more particularly, to fundamental mode, high power operation in double heterostructure junction lasers.

The advent of the semiconductor junction laser over a decade ago was heralded as a major breakthrough in the laser art. It potentially represented a compact, efficient, low power coherent radiation emitter that could be fabricated utilizing technology already well developed in the transistor art.

Early forms of the junction laser were fabricated from a single type of semiconductor material, e.g., GaAs, and are now known as homostructures. This device was a mixed blessing. On the one hand, it was, and still is, incapable of continuous wave (c.w.) operation at room temperature due largely to what is now recognized as a lack of carrier and optical confinement in the junction region. On the other hand, the lack of optical confinement resulted in suppression of higher order transverse modes. Advantageously, therefore, the homostructure junction laser inherently operated in the fundamental transverse mode.

In the summer of 1970, however, Drs. Izuo Hayashi and Morton B. Panish reported successful c.w. operation at room temperature of a new type of junction laser termed a GaAs-AlGaAs double heterostructure (DH). In this laser, a p-type GaAs active region was sandwiched between n- and p-type AlGaAs layers. Heterojunctions located at the interfaces with the ctive region provided both carrier and optical confinement which advantageously produced both lower lasing thresholds and a lower temperature dependence of the threshold. On the other hand, optical confinement meant that higher order transverse modes were permitted to oscillate. In many applications, however, noteably in an optical communications system or in a micrographics machining system, it is more desirable to have oscillation limited to the fundamental transverse mode, i.e., to facilitate coupling between optical components in a communications system or to produce higher power outputs in a micrographics system.

Several proposals have been made which are directed to attaining fundamental mode operation in modified forms of a DH laser. For example, Dr. Hayashi has proposed a double-double heterostructure (DDH) in which carriers and photons are confined to different but overlapping regions [see, copending application, Ser. No. 166,370 (Case 6), filed on July 27, 1971, now U.S. Pat. No. 3,733,561, issued on May 15, 1973], whereas Drs. L. A. D'Asaro and Jose E. Ripper have proposed controlling the gain distribution in the waveguide region between the heterojunctions to selectively suppress higher order modes [see, copending application Ser. No. 203,709 (Case 11-12), filed on Dec. 1, 1970, now abandoned]. Basically, both of the foregoing techniques introduce loss which is larger for higher order modes than for the fundamental mode. Thus, at high enough current levels above threshold where gain is commensurately higher, the possibility remains that even higher order modes may experience net gain and hence may oscillate. My invention, to be described hereinafter, may be used alone or in conjunction with either of the foregoing proposals to produce fundamental mode operation in a DH junction laser.

SUMMARY OF THE INVENTION

Fundamental mode operation in a DH laser is achieved in accordance with an illustrative embodiment of my invention by terminating the waveguide region at a distance L1 from a remote monolithic mirror. A passive region, which extends axially between the end of the waveguide region and the remote mirror, comprises a material having a low absorption loss to radiation generated in the waveguide region and is substantially impedance matched to the waveguide region; e.g., the passive region has a refractive index substantially equal to that of the waveguide region. Preferably, the waveguide region comprises GaAs and the passive region comprises AlGaAs with the atomic (nonzero) percent of aluminum adjusted so that the index of refraction of the AlGaAs is as nearly equal to that of GaAs as possible. In practice, a small impedance mismatch may be tolerated.

Two major advantages of my invention are: (1) reduced optical density and absorption near the remote mirror, which increases the threshold for catastrophic damage, thereby permitting higher power operation and, importantly, (2) nonnormal incidence at the remote mirror for higher order modes, which results in drastically reduced feedback of these modes into the waveguide region, thereby effectively suppressing higher order modes and producing fundamental mode operation. In order to achieve the latter result it is preferable in one embodiment of my invention (wherein the gain profile of the waveguide region is not tailored as taught by D'Asaro Case 11-12, supra) that the length L1 of the passive region (measured axially between the end of the waveguide region and the remote mirror) and the thickness $d$ of the waveguide region satisfy the inequality:

$$L1 \geq 10\, d \qquad (1)$$

It is of course apparent that if $L1$ were zero, the "remote" mirror would be identical with the end of the waveguide region and an appreciable fraction (depending on the rflectivity of the mirror) of the radiation generated in the waveguide region would be fed back into or contained within the waveguide region. Thus, both higher order and fundamental transverse modes would oscillate. However, as the remote mirror is moved away from the end of the waveguide region, a greater fraction of radiation from any higher mode fails to be fed back into the waveguide region because this radiation emanates therefrom at an angle and hence strikes the remote mirror at nonnormal incidence. That portion of the radiation not fed back represents loss for the higher order mode. Thus, at some distance L1 these losses exceed the gain and oscillation in the higher order mode ceases. In practice, it has been found that the distance L1 should preferably satisfy inequality (1).

In another embodiment of my invention, which incorporates a structure taught in D'Asaro case 11-12, supra, the requirements of inequality (1) are relaxed so that a smaller $L1$ can be utilized.

BRIEF DESCRIPTION OF THE DRAWING

My invention, together with its various features and advantages, can be easily understood from the following more detailed description taken in conjunction with the accompaning drawing in which.

For clarity and simplicity of illustration it will be appreciated that the figures have not necessarily been drawn to scale.

DETAILED DESCRIPTION

Fabrication

Figure 1A:
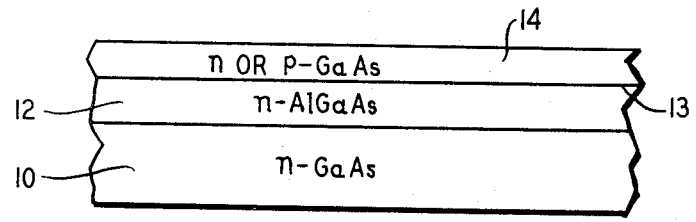
FIGS. 1A–1D show the sequential steps of an illustrative technique for fabricating one embodiment of my invention.
Figure 1B:
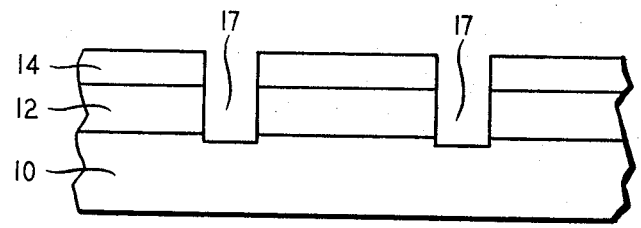
Figure 1C:
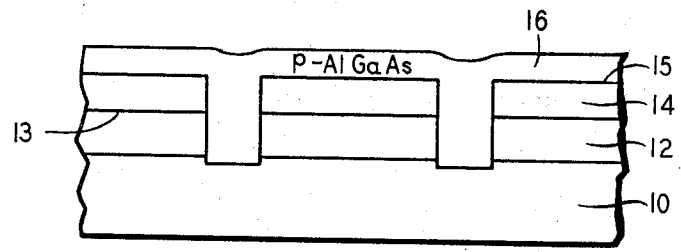
Figure 1D:
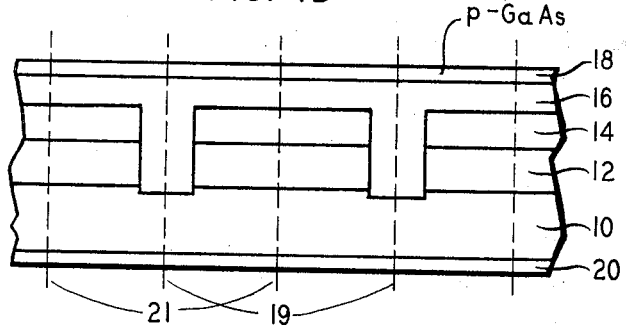

Turning now to FIGS. 1A to 1D, there are shown the sequential steps for fabricating an illustrative embodiment of my invention. As shown in FIG. 1A, on an n-GaAs substrate 10 there are illustratively grown by well known liquid phase epitaxy (LPE, sliding or tipping technique) an n-AlGaAs layer 12 and then an n- or p-GaAs layer 14, thereby forming a heterojunction 13 at the interface between layers 12 and 14. Layer 14 will ultimately form the active or waveguide region of a double heterostructure. Next, channels 17 are etched, or otherwise formed, preferably parallel to the substrate plane and perpendicular to the plane of the paper. The channel should extend at least through layer 14, and as shown in FIG. 1B, illustratively extends into the substrate 10. The next step shown in FIG. 1C is to grow by LPE a p-AlGaAs layer 16 over the now segmented portions of layer 14 as well as in the channels 17. Layer 16 forms another heterojunction 15 at the interface with layer 14. Thus, layers 12, 14 and 16 and heterojunctions 13 and 15 form a double heterostructure. For contacting purposes, the recesses in layer 15 are removed by polishing, or other suitable technique. Finally, as shown in FIG. 1D, metallic contacts 18 and 20 are deposited on layer 16 and substrate 10 respectively. Preferably, contact 18 has a stripe geometry for well known reasons related to the control of transverse modes parallel to the p-n junction plane. Such a contact may be defined either by well known oxide masking techniques or by a proton bombardment technique described by Drs. D'Asaro, Dyment, Kuhn and Spitzer in copending application Ser. No. 204,222 (Case 10–4–6–3) filed on Dec. 2, 1971. After the contacts are formed, the structure is cleaved along planes 19 which intersect the channels 17 and along planes 21 which intersect the double heterostruction portions. Of course, cleaving, described in only two dimensions above, would in practice include cleaving and/or scribing in all three dimensions to form ultimately a plurality of DH laser devices in accordance with my invention.

Figure 2:
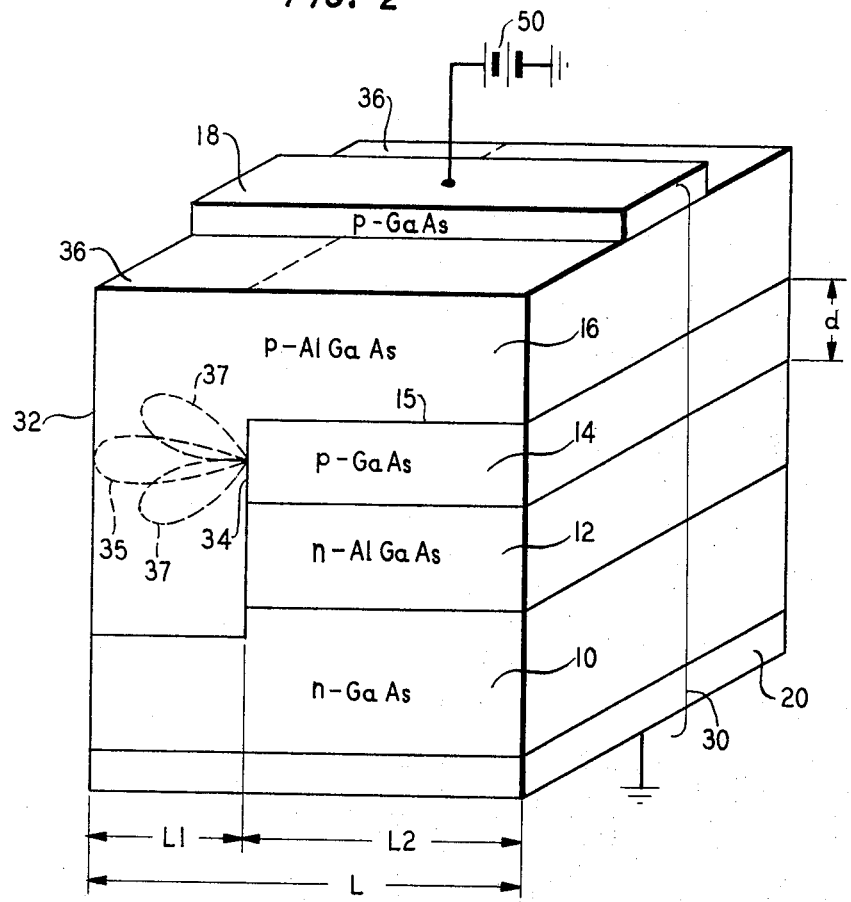
FIG. 2 is a schematic of an illustrative embodiment of my invention which can be fabricated by the technique described with reference to FIGS. 1A–1D.

One such device, shown in FIG. 2, comprises a pair of cleaved surfaces 30 and 32 which form the mirrors of a Fabry-Perot resonator of length L. Typically, for a GaAs -air interface mirror 30 has natural reflectivity of about 32 percent. Of course an appropriate reflecting coating (not shown) may be formed on mirror 30 to increase its reflectivity, if desired. On the other hand, mirror 32, termed the remote mirror, is made highly transmissive (e.g., 95 percent) with the use of an antireflective coating (not shown). Because of the high internal gain of the GaAs laser, these reflectivities provide sufficient feedback to sustain oscillations.

Between the mirrors the device comprises a double heterostructure portion of length L2 in which at least the waveguide region (layer 14) is terminated at a point distant from remote mirror 32, i.e., at a distance $L1$ therefrom, where $L1 + L2 = L$. A passive region of length L1, formed by a portion of AlGaAs layer 14 grown in a channel 17, extends axially between the end 34 of the active region and the remote mirror 32.

In general, the passive region should preferably satisfy the following conditions: (i) it should have a low absorption loss to radiation generated in the waveguide region, e.g., it should have a wider bandgap than the waveguide region and (ii) it should be impedance matched to the waveguide region, e.g., it should have a refractive index as nearly equal as possible to that of the waveguide region consistent with condition (i). Condition (ii) arises from the fact that end 34 of layer 14 should not act as a reflector, i.e., it is desired that the radiation penetrate the passive region where suppression of higher order modes takes place. Thus, for example, by adjusting the amount of aluminum so that layer 16 comprises $Al_{0.1}Ga_{0.9}As$, the bandgap of the passive region is made about 150 meV greater than that of the p-GaAs waveguide region, which is sufficient to substantially reduce optical absorption in the passive region. Yet, for this AlGaAs composition the difference in refractive index between the waveguide and passive regions is only about 0.8 percent, which causes only an insignificant amount of reflection at end 34.

The layers of the double heterostructure described above may be more generally described as follows: an $N\text{-}Al_xGa_{1-x}As$ layer 12, $x > 0$; an n or p or compensated $Al_yGa_{1-y}As$ layer 14, $0 \leq y < x$, and a p-$Al_zGa_{1-z}As$ layer 16, $z > y$. It is also intended that the term "double heterostructure" as used herein shall include various modifications of the DH such as the DDH of Hayashi Case 6, supra.

Moreover, since only the double heterostructure portion of length L2 generates radiation, it may be desirable to either make stripe contact 18 of length L2 only (i.e., by removing that portion of contact 18 in region 36), or alternatively by proton bombarding region 36 prior to the formation of contact 18 of length L. As mentioned previously, the proton bombardment technique is described in D'Asaro et al. Case 10–4–6–3, supra.

To reduce heat dissipation problems, and for c.w. operation at room temperature, one or more heat sinks may be thermally coupled to either or both substrate 10 (through contact 20) or layer 16 (through contact 18). In particular, for c.w. operation at room temperature the thickness of the waveguide region should be between $\lambda/2$ and $1.0\mu m$ as described by Dr. Hayashi in his copending application Ser. No. 33,705 (Case 4) filed on May 1, 1970, now U.S. Pat. No. 3,758,875, issued on Sept. 11, 1973.

In contrast, pulsed, higher power, fundamental mode operation has been achieved with thicker waveguide regions (e.g., $2.0\mu m$) by Drs. D'Asaro and Ripper by judiciously positioning a p-n homojunction between the heterojunctions of a DH laser. That is, as shown in FIG.

Figure 3:
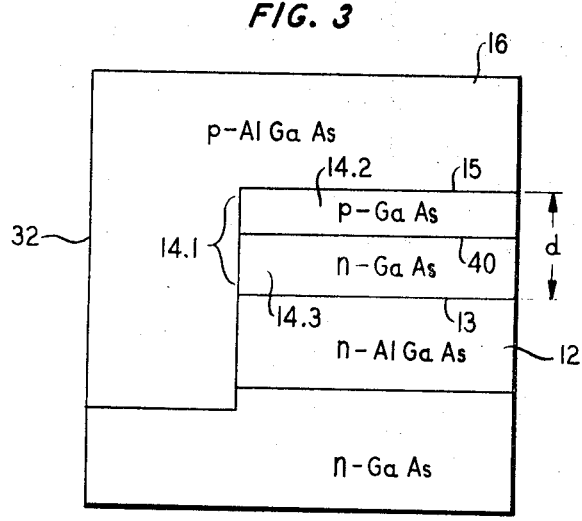
FIG. 3 is a schematic of another embodiment of my invention incorporating a structure taught by D'Asaro case 11–12, supra.

3 a p-n homojunction 40 is located between heterojunctions 13 and 15 so that the ratio of the thickness of the n-type (lossy) region 14.3 to total thickness $d$ of the waveguide region 14.1 is less than 0.5 and preferably in the range 0.2 to 0.4. See their Case 11–12, supra. Note in the embodiment of FIG. 2, layer 14 is both the active region and the waveguide region. In FIG. 3, however, the active region is layer 14.2 and the waveguide region 14.1 comprises layers 14.2 and 14.3 together.

Operation

In operation, the device of FIG. 2 or FIG. 3 is forward-biased by means of a d.c. source, illustratively battery 50, connected between contacts 18 and 20. Electrons thus injected into the active region undergo radiative recombination with holes in the valence band to generate radiation which propagates to the p-n junction plane. Depending on the aluminum composition of the active region the wavelength of this radiation ranges between about 7,400 to 9,000 Angstroms — which is related to the bandgap of the active region. As mentioned previously, the transverse modes parallel to the p-n junction plane are controlled by the width of stripe contact 18. A width of about $12\mu m$ has been found to effectively restrict oscillation to the fundamental transverse mode parallel to the junction plane. On the other hand, control of the transverse modes perpendicular to the junction plane, which is the subject matter of my invention, occurs in the passive region between the end 34 of the waveguide region and remote mirror 32.

More specifically, provided there is no substantial impedance mismatch, i.e., a large refractive index discontinuity at end 34, nearly all radiation generated in the active region and incident on end 34 will emanate into the passive region. The spatial intensity distribution of the fundamental transverse mode perpendicular to the junction plane has a single main lobe 35 which is directed normal to remote mirror 32. Consequently, a fraction of the fundamental mode radiation reflected from mirror 32 is fed back into the waveguide region where it experiences sufficient gain to sustain its oscillation. In practice the fraction reflected back may be only 1–2 percent which, however, is sufficient to sustain oscillation due to the inherently high internal gain of the device, as previously mentioned. In contrast, the spatial intensity distribution of the second order mode perpendicular to the junction has a pair of lobes 37 directed at an acute angle to remote mirror 32. Consequently, very little (e.g., a fraction of 1 percent) of the second order mode radiation reflected from mirror 32 is fed back into the waveguide region — provided that inequality (1) is satisfied, i.e., $L1 \geq 10\,d$. A similar situation obtains for other higher order modes but to a higher degree of discrimination. Typically, the waveguide region thickness $d$ is $\leq 1\mu m$ for c.w. operation at room temperature. In that case, $L1$ should be greater than $10\mu m$. For higher power operation $d$ might be $4.0\mu m$ in which case $L1$ should be greater about $40\mu m$.

By utilizing th embodiment of FIG. 3, however, a considerably smaller $L1$ then that required by inequality (1) can be tolerated because the gain profile of the waveguide region 14.1 of this embodiment tends to suppress higher order modes — at least at relatively lower current levels above threshold (see, D'Asaro et al. Case 11–12, supra). Illustratively, with $d = 4.0\mu m$, the thickness of the n and p GaAs layers 14.3 and 14.2, respectively, is preferably about $1.3\mu m$ and $2.7\mu m$ respectively. Layers 12 and 16 comprise $Al_{0.3}Ga_{0.7}As$ so that $\Delta n = 0.1$ at each of the heterojunctions 13 and 15. The remote mirror 32, which is the cleavage face of epitaxially grown AlGaAs layer 16, is located only $20\mu m$ from the end of the waveguide region. To reduce losses in the passive region a partially antireflective coating (not shown; reflectivity about 5 percent) may be applied to the remote mirror 32. Under these conditions the reflectivity of the fundamental mode at $\lambda = 0.9\mu$ m is about 1.65 percent whereas that of the second order mode is only 0.1 percent. Higher order modes, both odd and even, have much lower reflectivities. Although the use of a remote mirror increases losses by about 37 $cm^{-1}$, which raises the current density threshold by 2.5 $kA/cm^2$, still 82 percent of the total laser power exits from the remote mirror 32, 14 percent from the opposite mirror 30 and 4 percent is lost in the AlGaAs passive region.

The foregoing illustrative embodiment is suitable for a micrographics laser machining system in which the laser source desirably provides about 0.5 watts of peak power in the fundamental transverse mode over a 100 nanosecond time duration and at 1 MHz repetition rate. Such a system is described by Dr. D. Maydan et al. in copending application Ser. No. 115,029 (Case 3–2–12) filed on Feb. 12, 1971, now U.S. Pat. No. 3,720,784, issued on Mar. 13, 1973.

It is to be understood that the above-described arrangements are merely illustrative of the many possible specific embodiments which can be devised to represent application of the principles of our invention. Numerous and varied other arrangements can be devised in accordance with these principles by those skilled in the art without departing from the spirit and scope of the invention. In particular, because the bandgap of the passive region is larger than that of the active region of the double heterostructure, the optical absorption in the passive region of radiation generated in the active region is minimal. Consequently, the threshold for catastrophic damage is increased, i.e., high power densities can be tolerated, and hence high power outputs obtained, before mirror damage results from over heating. Moreover, where the refractive index of the passive region is substantially different from that of the waveguide region, a quarter wavelength impedance matching layer may be disposed therebetween to reduce reflections at end 34.

There is being filed concurrently herewith a related application in the name of S. E. Miller (Case 63), Ser. No. 286,282 entitled "Fundamental Transverse Mode Operation in Solid State Lasers" and assigned to the assignee hereof.

What is claimed is:

1. In a semiconductor junction laser, a semiconductor body, comprising:

a double heterostructure portion including an epitaxial first layer of n-$Al_xGa_{1-x}As$, $x > 0$, an epitaxial second region of $Al_yGa_{1-y}As$, $0 \leq y < x$ contiguous with said first layer, said second region forming a waveguide region and including a planar p-n junction, and a third epitaxial layer of p-$Al_zGa_{1-z}As$, $z > y$, contiguous with said second region, said double heterostructure portion having a first face forming one mirror of an optical cavity resonator for sustaining stimulated radiation produced by the radiative recombination of holes and electrons in said waveguide region and further having an internal second face, opposite to said first face, through which said radiation is transmitted;

an $Al_zGa_{1-z}As$ passive portion disposed contiguous with said second face and in the path of said radiation, said passive portion having a third face, opposite to said first face, and forming another mirror of said resonator, at least one of said first and third faces being partially transmissive to permit the egress of radiation from said resonator, said passive portion and said third layer forming one continuous L-shaped region in order to reduce reflections of said radiation at said second face, and the length of said passive portion measured in the direction of propagation of said radiation being much greater than the thickness of said waveguide region measured perpendicular to the plane of said p-n junction so that radiation perpendicular to the plane of said junction is restricted to the fundamental transverse mode; and a pair of electrical contacts formed on opposite sides of said body and parallel to said p-n junction, at least one of said contacts having a stripe geometry effective to restrict radiation parallel to the plane of said junction to the fundamental transverse mode.

* * * * *